United States Patent
Boss et al.

(10) Patent No.: US 8,218,750 B2
(45) Date of Patent: Jul. 10, 2012

(54) CONFERENCE CALL MANAGEMENT METHOD AND SYSTEM

(75) Inventors: Gregory J. Boss, Saginaw, MI (US);
Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

(*) Notice: Subject to any disclaimer, the term of this patent is extended or adjusted under 35 U.S.C. 154(b) by 9 days.

(21) Appl. No.: 12/840,364

(22) Filed: Jul. 21, 2010

(65) Prior Publication Data
US 2012/0020468 A1 Jan. 26, 2012

(51) Int. Cl.
H04M 3/56 (2006.01)
H04N 7/15 (2006.01)
H04L 12/18 (2006.01)
G06F 15/16 (2006.01)

(52) U.S. Cl. ............ 379/202.01; 348/14.08; 370/260; 370/261; 370/262; 379/203.01; 455/416; 709/204

(58) Field of Classification Search ...... 348/14.08–14.1; 709/204, 205
See application file for complete search history.

(56) References Cited

U.S. PATENT DOCUMENTS

| | | | |
|---|---|---|---|
| 5,497,415 A | 3/1996 | Kagi | |
| 5,642,156 A | 6/1997 | Saiki | |
| 5,825,858 A | 10/1998 | Shaffer et al. | |
| 6,940,960 B2 | 9/2005 | Benco et al. | |
| 7,398,295 B2* | 7/2008 | Shoroff et al. | 709/204 |
| 2005/0254440 A1* | 11/2005 | Sorrell | 370/264 |
| 2006/0182249 A1* | 8/2006 | Archambault et al. | 379/202.01 |
| 2007/0067387 A1* | 3/2007 | Jain et al. | 709/204 |
| 2007/0208806 A1* | 9/2007 | Mordecai et al. | 709/204 |
| 2007/0217589 A1 | 9/2007 | Martin et al. | |
| 2008/0037752 A1 | 2/2008 | Chatilov et al. | |
| 2008/0159490 A1* | 7/2008 | Gaudin et al. | 379/88.16 |
| 2008/0256182 A1* | 10/2008 | Sekaran et al. | 709/204 |

FOREIGN PATENT DOCUMENTS
JP 2008005188 A 1/2008

OTHER PUBLICATIONS

Ding et al; An Empirical Study of the use of Visually Enhanced VoIP Audio Conference: The Case of IEAC; CHI 2077 Proceedings; Apr. 28-May 3, 2007, San Jose, CA; pp. 1019; 2131-2139.
Marathe et al.; A Comprehensive Call Management Strategy for Congestion Control in Cellular Networks; Electrical Engineering Department, Indian Institute of Technology, Bombay, Powai, Mumbai, IN 400 076; 1-4244-0614-5/7 copyright 2007 IEEE; 7 pages.

* cited by examiner

*Primary Examiner* — Harry Hong
(74) *Attorney, Agent, or Firm* — Schmeiser, Olsen & Watts; Anna Linne

(57) ABSTRACT

A conference call management method and system. The method includes receiving by a computer processor from a conference call administrator, a command for enabling a first conference call. The computer processor enables the first conference call thereby allowing telecommunications between the conference call administrator and a first participant. The computer processor locks the first conference call such that additional participants are unable to access the first conference call. The computer processor receives from a second participant, a conference call request for accessing a second conference call and routes the second participant to a virtual holding area. The computer processor enables the second conference call and routes the second participant from the virtual holding area to the second conference call.

20 Claims, 4 Drawing Sheets

CONFERENCE CALL MANAGEMENT METHOD AND SYSTEM

FIELD OF THE INVENTION

The present invention relates to a method and associated system for managing a conference call for individuals.

BACKGROUND OF THE INVENTION

Managing multiple parties during communications typically comprises an inefficient process with little flexibility. Parties are typically allowed to communicate without any regard to additional factors. Parties communicating without regard to additional factors may result in prohibited communications.

SUMMARY OF THE INVENTION

The present invention provides a method comprising: receiving, by a computer processor of a computing device from a conference call administrator, a first command for enabling a first conference call; first enabling, by the computer processor in response to the first command, the first conference call, the first conference call allowing telecommunications between the conference call administrator and a first participant; locking, by the computer processor in response to the first enabling, the first conference call such that additional participants are unable to access the first conference call; generating, by the computer processor in response to the locking, a virtual holding area for participants associated with a second conference call differing from the first conference call; receiving, by the computer processor from a second participant, a conference call request for accessing the second conference call, the second participant differing from the first participant; routing, by the computer processor in response to the conference call request; the second participant to the virtual holding area; second enabling, by the computer processor in response to a second command from the conference call administrator, the second conference call; and routing, by the computer processor in response to the second enabling; the second participant from the virtual holding area to the second conference call.

The present invention provides a computer program product, comprising a computer readable medium having a computer readable program code embodied therein, the computer readable program code comprising an algorithm adapted to implement a method within a computing device, the comprising: receiving, by a computer processor of the computing device from a conference call administrator, a first command for enabling a first conference call; first enabling, by the computer processor in response to the first command, the first conference call, the first conference call allowing telecommunications between the conference call administrator and a first participant; locking, by the computer processor in response to the first enabling, the first conference call such that additional participants are unable to access the first conference call; generating, by the computer processor in response to the locking, a virtual holding area for participants associated with a second conference call differing from the first conference call; receiving, by the computer processor from a second participant, a conference call request for accessing the second conference call, the second participant differing from the first participant; routing, by the computer processor in response to the conference call request; the second participant to the virtual holding area; second enabling, by the computer processor in response to a second command from the conference call administrator, the second conference call; and routing, by the computer processor in response to the second enabling; the second participant from the virtual holding area to the second conference call.

The present invention provides a computing system comprising a computer processor coupled to a computer-readable memory unit, the memory unit comprising instructions that when enabled by the computer processor implements a method comprising: receiving, by the computer processor from a conference call administrator, a first command for enabling a first conference call; first enabling, by the computer processor in response to the first command, the first conference call, the first conference call allowing telecommunications between the conference call administrator and a first participant; locking, by the computer processor in response to the first enabling, the first conference call such that additional participants are unable to access the first conference call; generating, by the computer processor in response to the locking, a virtual holding area for participants associated with a second conference call differing from the first conference call; receiving, by the computer processor from a second participant, a conference call request for accessing the second conference call, the second participant differing from the first participant; routing, by the computer processor in response to the conference call request; the second participant to the virtual holding area; second enabling, by the computer processor in response to a second command from the conference call administrator, the second conference call; and routing, by the computer processor in response to the second enabling; the second participant from the virtual holding area to the second conference call.

The present invention advantageously provides a simple method and associated system capable of managing multiple parties during communications.

DETAILED DESCRIPTION OF THE INVENTION

Figure 1:
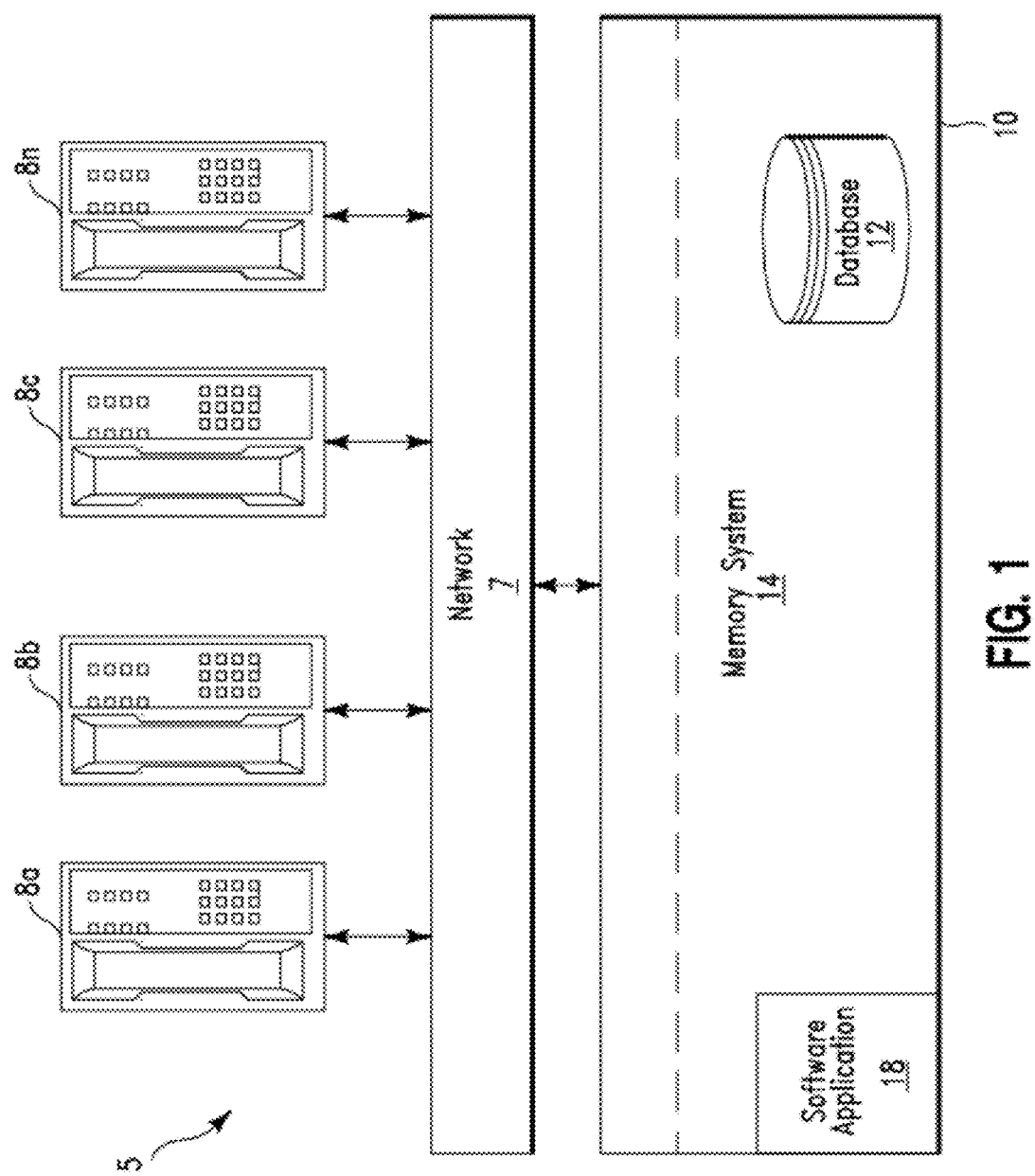
FIG. 1 illustrates a system for managing conference call participants, in accordance with embodiments of the present invention.

FIG. 1 illustrates a system 5 for managing conference call participants, in accordance with embodiments of the present invention. System 5 enables a process for managing sequentially scheduled teleconference calls (e.g., back to back teleconference calls). For example, if a conference call administrator (i.e., a user that schedules and initiates teleconference calls) schedules back to back teleconference calls (e.g., referred to as call 1 and call 2) reusing the same teleconference system, one or more participants of call 2 (i.e., the second scheduled teleconference call) may join call 1 (i.e., the first scheduled teleconference call) prior to the completion of call 1 (e.g., call 1 continues after its scheduled ending time). Depending on the nature of call 1, there may be issues with call 2 participants hearing content discussed during call 1. For example call 1 may be associated with confidential, legal, human resource related, or other sensitive information and call 2 participants are not authorized to access this information. System 5 enables a method to restrict valid participants of a teleconference conference call from hearing the content of an unauthorized teleconference call (i.e., the multiple teleconference calls use a same conference call bridge) when the teleconference calls are back to back.

System 5 of FIG. 1 comprises devices 8a . . . 8n connected through a network 7 to a computing system 10. Devices 8a . . . 8n may comprise any type of telecommunication devices such as, inter alia, a telephone, a cellular telephone, a PDA, a laptop computer, a tablet computer, etc. Network 7 may comprise any type of network including, inter alia, a telephone network, a local area network, (LAN), a wide area network (WAN), the Internet, a wireless network, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 may comprise multiple schedules associated with scheduled teleconferences. Software application 18 enables the following method:
1. A conference bridge owner (i.e., a conference call administrator) schedules two back-to-back conference calls, each including one or more different participants.
2. The conference bridge owner initiates a bridge function that moves any new participants (i.e., to a bridge or conference call) to a virtual holding area (e.g., a separate conference bridge/sub-bridge, a hold state, etc). Any additional authenticated participants joining the bridge are placed into the aforementioned virtual holding area.
3. The conference bridge owner initiates a bridge function that moves participants currently in the virtual holding area into a main conference bridge.

Figure 2:
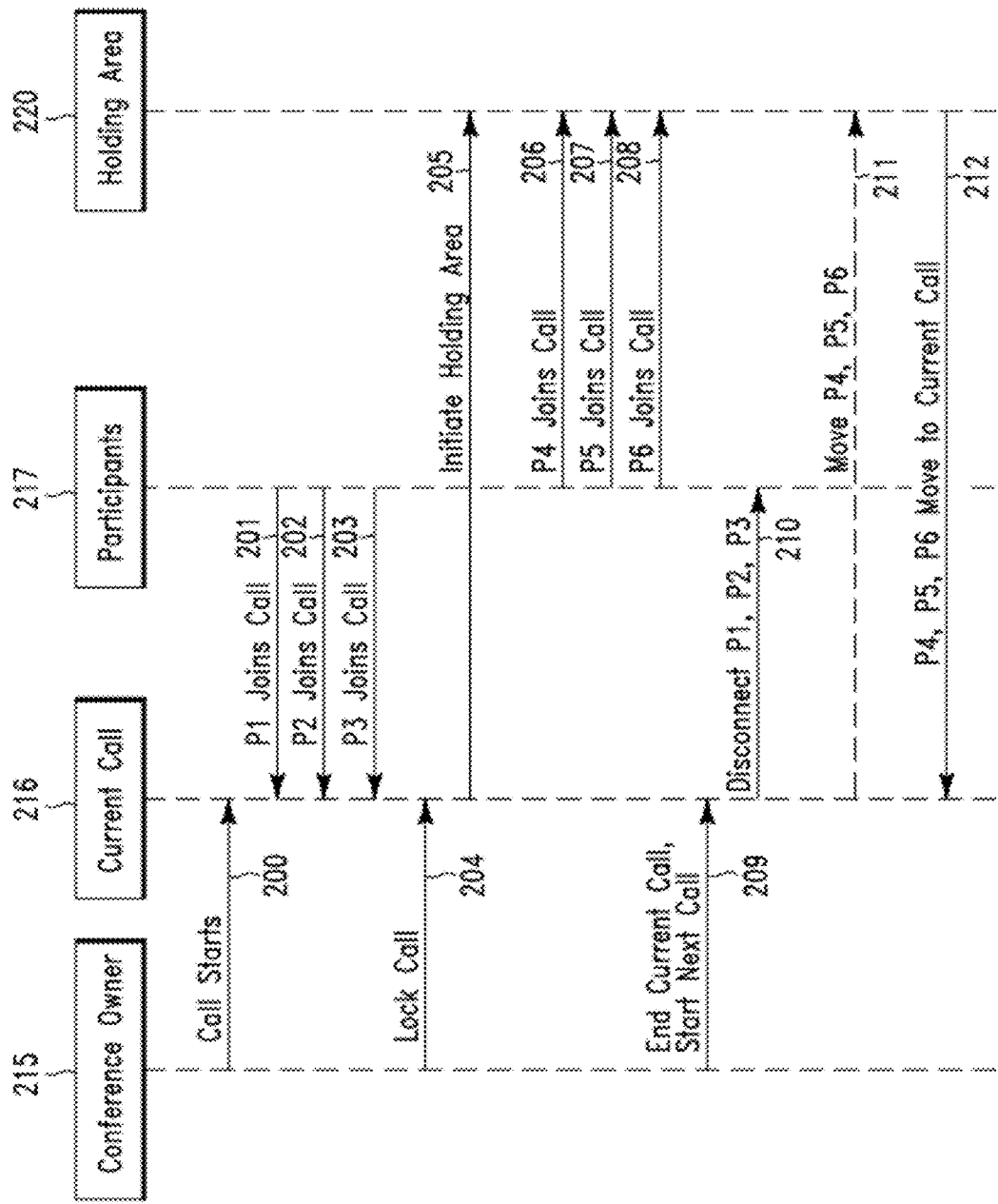
FIG. 2 illustrates an algorithm describing an implementation example enabled by the system of FIG. 1, in accordance with embodiments of the present invention.

FIG. 2 illustrates an algorithm describing an implementation example enabled by system 5 of FIG. 1, in accordance with embodiments of the present invention. In step 200, a conference call (i.e., current call 216) is established by a conference (call) owner 215. In steps 201, 202, and 203, participants P1-P3 join current call 216. In step 204, conference owner 215 locks (e.g., via a lock call function) current call 216. The lock call function may be automatically or manually initiated by conference owner 215 via the following methods:
1. A DTMF key sequence using a phone keypad.
2. A VoIP graphical call management interface enabled by a computer (e.g., client application, browser application, etc).
3. Automatically by a conference call system based upon predefined conference call owner preferences or system wide preferences.

Additionally, the lock call function may be enabled to place any new participants calling into current call 216 into a virtual holding area 220 as described, infra (e.g., any participants joining in the past "n" minutes are placed in the holding area along with any new participants that join). A value of "n" may comprise an owner or system default value or may be entered by conference owner 215 at a time that current call 216 is initiated. For example:
1. Conference owner 215 enables a specific key combination (e.g. *330) on his/her phone keypad and all new participants are moved to virtual holding area 220.
2. Conference owner 215 enables a specific key combination (e.g. *332) on his/her phone keypad and all new participants are moved to virtual holding area 220 along with any participants that have joined in last two minutes. The number of minutes defined by the ones digit in the specific key combination example (*332).

In step 205, the conference system (e.g., computing system 10 of FIG. 1) locks the current call and creates a virtual holding area 220. Virtual holding area 220 may comprise a 2nd conference bridge number enabled by conference owner 215. Alternatively, virtual holding area 220 may comprise a virtual space that is equivalent to muting an audio signal and putting specific callers on hold (i.e., in a muted state) such that the specific callers may not hear or participate in a conversation of current call 216. As new participants P4-P6 dial into the conference bridge, the conference system places them (in steps 206-208) in virtual holding area 220. In step 209, conference owner 215 ends current call 215 and initiates a next call via any of the following methods:
1. Conference owner 215 enables a specific key combination (e.g. *330) on his/her phone keypad and all new participants are moved to virtual holding area 220.
2. Conference owner 215 enables a specific key combination (e.g. *352) on his/her phone keypad and all new participants are moved to virtual holding area 220 along with any participants that have joined in last 2 minutes.

Alternatively, (i.e., instead of moving participants into a current call bridge) conference owner 215 may be moved in to a holding area bridge if it is implemented as a second bridge. Additionally, conference owner 215 may enable a call switch function giving an option of swapping back and forth between the two virtual bridges thereby allowing conference owner 215 to inform users (in a holding bridge) that a prior call is close to completion and that the next call will be starting shortly. Alternatively, conference call owner 215 may setup the conference system with an automated message that is broadcasted for the holding bridge while maintaining a position in the original call. In step 210, the conference system disconnects current participants P1-P3 and in steps 211 and 212, the conference system moves holding participants P4-P6 to a current call.

As an additional embodiment, participants that comprise members of both a prior call and a new call, may continue to be connected to the bridge. For example, conference call owner 215, may command the conference call system to hold over that person using same methods as the manual lock call function as described supra. Additionally, the conference call system may observe that a calendar invitation for both calls is common to that person and automatically holds over that person. The conference call system may additionally request additional credentials (e.g., a new conference pass code, a predefined password, etc).

Figure 3:
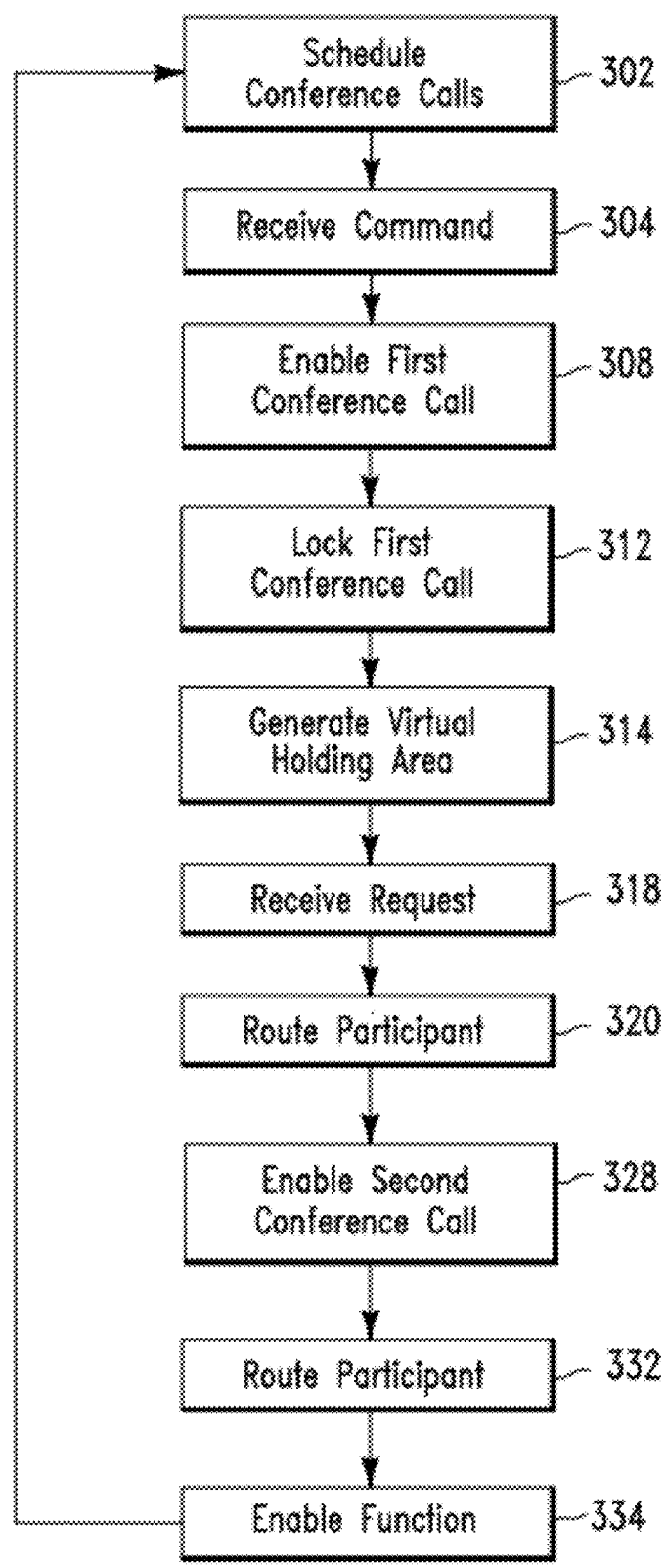
FIG. 3 illustrates a flowchart describing an algorithm used by the system of FIG. 1 for managing conference call participants, in accordance with embodiments of the present invention.

FIG. 3 illustrates a flowchart describing an algorithm used by system 5 of FIG. 1 for managing conference call participants, in accordance with embodiments of the present invention. In step 302, a computer processor of a computing system (e.g., computing system 10 of FIG. 1) receives (from a conference call administrator via a telecommunication device such as, inter alia, a telephone, a cellular telephone, a PDA, a laptop computer, a tablet computer, etc) commands for scheduling multiple conference calls. In step 304, the computer processor receives (from the conference call administrator via the telecommunication device) a command for enabling a first conference call. In step 308, the computer processor enables (i.e., in response to the command of step 304) the first conference call. The first conference call allows telecommunications between the conference call administrator and a first participant(s). In step 312, the computer processor locks (i.e., in response to enabling the first conference call) first conference call such that additional participants are unable to access the first conference call. In step 314, the computer processor generates a virtual holding area(s) for participants associated with additionally scheduled conference calls (i.e., differing from the conference call). While in the virtual holding area, the participants may or may not be able to communicate with each other. In step 318, the computer processor receives (i.e., from a second participant(s)) a conference call request for accessing a second conference call. In step 320, the computer processor routes (i.e., in response to the conference call request of step 318) the second participant(s) to the virtual holding area(s). In step 328, the computer processor enables the second conference call. In step 332, the computer processor routes the second participant from the virtual holding area to the second conference call. In step 334, the computer processor enables any of the following functions:

1. Disabling the first conference call.
2. Enabling a call switch function associated with the first conference call and the second conference call. The call switch function disables telecommunications between the conference call administrator and the first participant and enables telecommunications between the conference call administrator and the second participant.
3. Transmitting (to the conference call administrator) an indicator signal indicating the first conference call request.
4. Routing a third participant from the virtual holding area to the first conference call.
5. Transmitting an indicator indicating that the third participant may not access the first conference call.
6. Toggling the conference call administrator (i.e., communications) between the first conference call and the second conference call.

Figure 4:
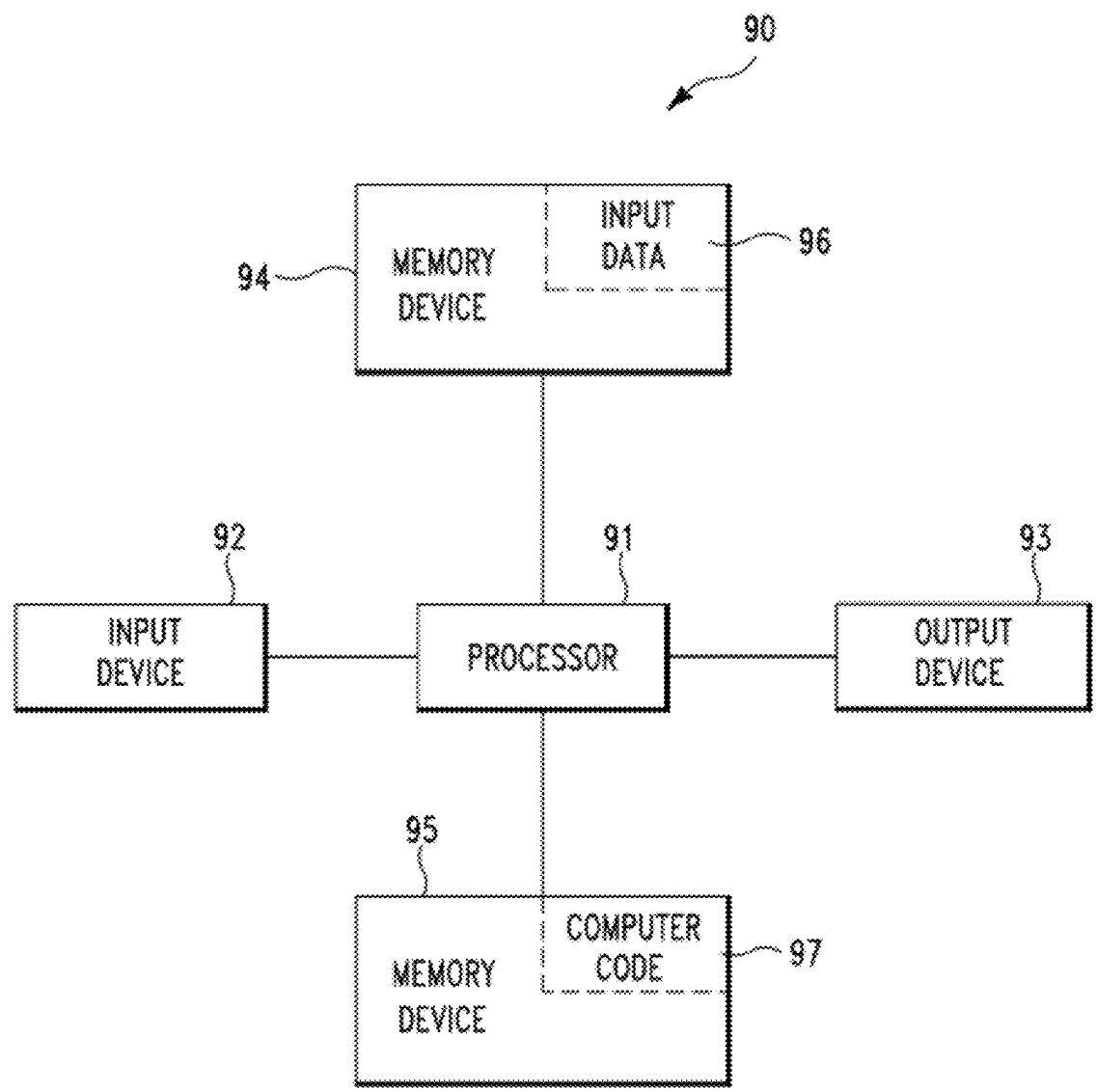
FIG. 4 illustrates a computer apparatus used for managing conference call participants, in accordance with embodiments of the present invention.

FIG. 4 illustrates a computer apparatus 90 (e.g., computing system 10 of FIG. 1) used for managing conference call participants, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for managing conference call participants. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to manage conference call participants. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing conference call participants. In another embodiment, the invention provides a method that performs the process steps of the invention on a subscription, advertising, and/or fee basis. That is, a service provider, such as a Solution Integrator, could offer to manage conference call participants. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a computing device from a conference call administrator, a first command for enabling a first conference call;
first enabling, by said computer processor in response to said first command, said first conference call, said first conference call allowing telecommunications between said conference call administrator and a first participant;
locking, by said computer processor in response to said first enabling, said first conference call such that additional participants are unable to access said first conference call;
generating, by said computer processor in response to said locking, a virtual holding area for participants associated with a second conference call differing from said first conference call;
receiving, by said computer processor from a second participant, a conference call request for accessing said second conference call, said second participant differing from said first participant;
routing, by said computer processor in response to said conference call request; said second participant to said virtual holding area;
second enabling, by said computer processor in response to a second command from said conference call administrator, said second conference call; and
routing, by said computer processor in response to said second enabling; said second participant from said virtual holding area to said second conference call.

2. The method of claim 1, further comprising:
disabling, by said computer processor in response to said second enabling, said first conference call.

3. The method of claim 1, further comprising:
enabling, by said computer processor, a call switch function associated with said first conference call and said second conference call;
disabling, by said computer processor executing said call switch function, said telecommunications between said conference call administrator and said first participant; and
enabling, by said computer processor executing said call switch function, telecommunications between said conference call administrator and said second participant.

4. The method of claim 1, wherein said first conference call is enabled across a first virtual bridge, and wherein said second conference call is enabled across a second virtual bridge.

5. The method of claim 1, further comprising:
receiving, by said computer processor from said conference call administrator, a first scheduling command for scheduling said first conference call;
scheduling, by said computer processor in response to said first scheduling command, said first conference call;
receiving, by said computer processor from said conference call administrator, a second scheduling command for scheduling said second conference call; and
scheduling, by said computer processor in response to said second scheduling command, said second conference call, wherein said first conference call is scheduled to end at a first time, and wherein said second conference call is scheduled to begin at a second time occurring after said first time has elapsed.

6. The method of claim 1, further comprising:
receiving, by said computer processor from a third participant after said first conference call has been enabled, a first conference call request for accessing said first conference call;
routing, by said computer processor in response to said first conference call request; said third participant to said virtual holding area; and
transmitting, by said computer processor to said conference call administrator, an indicator signal indicating said first conference call request.

7. The method of claim 6, further comprising:
routing, by said computer processor in response to a command from said conference call administrator, said third participant from said virtual holding area to said first conference call.

8. The method of claim 6, further comprising:
transmitting, by said computer processor to said third participant, an indicator indicating that said third participant may not access said first conference call.

9. The method of claim 1, further comprising:
toggling, by said computer processor, said conference call administrator between said first conference call and said second conference call.

10. The method of claim 1, further comprising:
providing at least one support service for at least one of creating, integrating, hosting, maintaining, and deploying computer-readable code in said computing system, wherein the code in combination with the computing system is capable of performing: said receiving said first command, said first enabling, said locking, said generating, said receiving said conference call request, said routing said second participant to said virtual holding area, said second enabling, and said routing said second participant from said virtual holding area to said second conference call.

11. A computer program product, comprising a computer readable storage device storing a computer readable program code, said computer readable program code comprising an algorithm that when executed by a computer processor of a computing device implements a method, said method comprising:
receiving, by said computer processor of said computing device from a conference call administrator, a first command for enabling a first conference call;
first enabling, by said computer processor in response to said first command, said first conference call, said first conference call allowing telecommunications between said conference call administrator and a first participant;
locking, by said computer processor in response to said first enabling, said first conference call such that additional participants are unable to access said first conference call;
generating, by said computer processor in response to said locking, a virtual holding area for participants associated with a second conference call differing from said first conference call;
receiving, by said computer processor from a second participant, a conference call request for accessing said second conference call, said second participant differing from said first participant;
routing, by said computer processor in response to said conference call request; said second participant to said virtual holding area;
second enabling, by said computer processor in response to a second command from said conference call administrator, said second conference call; and
routing, by said computer processor in response to said second enabling; said second participant from said virtual holding area to said second conference call.

12. The computer program product of claim 11, wherein the method further comprises:
disabling, by said computer processor in response to said second enabling, said first conference call.

13. The computer program product of claim 11, wherein the method further comprises:
enabling, by said computer processor, a call switch function associated with said first conference call and said second conference call;
disabling, by said computer processor executing said call switch function, said telecommunications between said conference call administrator and said first participant; and
enabling, by said computer processor executing said call switch function, telecommunications between said conference call administrator and said second participant.

14. The computer program product of claim 11, wherein said first conference call is enabled across a first virtual bridge, and wherein said second conference call is enabled across a second virtual bridge.

15. The computer program product of claim 11, wherein the method further comprises:
receiving, by said computer processor from said conference call administrator, a first scheduling command for scheduling said first conference call;
scheduling, by said computer processor in response to said first scheduling command, said first conference call;
receiving, by said computer processor from said conference call administrator, a second scheduling command for scheduling said second conference call; and
scheduling, by said computer processor in response to said second scheduling command, said second conference call, wherein said first conference call is scheduled to end at a first time, and wherein said second conference call is scheduled to begin at a second time occurring after said first time has elapsed.

16. The computer program product of claim 11, wherein the method further comprises:
   receiving, by said computer processor from a third participant after said first conference call has been enabled, a first conference call request for accessing said first conference call;
   routing, by said computer processor in response to said first conference call request; said third participant to said virtual holding area; and
   transmitting, by said computer processor to said conference call administrator, an indicator signal indicating said first conference call request.

17. The computer program product of claim 16, wherein the method further comprises:
   routing, by said computer processor in response to a command from said conference call administrator, said third participant from said virtual holding area to said first conference call.

18. The computer program product of claim 16, wherein the method further comprises:
   transmitting, by said computer processor to said third participant, an indicator indicating that said third participant may not access said first conference call.

19. The computer program product of claim 11, wherein the method further comprises:
   toggling, by said computer processor, said conference call administrator between said first conference call and said second conference call.

20. A computing system comprising a computer processor coupled to a computer-readable memory unit, said memory unit comprising instructions that when enabled by the computer processor implements a method comprising:
   receiving, by said computer processor from a conference call administrator, a first command for enabling a first conference call;
   first enabling, by said computer processor in response to said first command, said first conference call, said first conference call allowing telecommunications between said conference call administrator and a first participant;
   locking, by said computer processor in response to said first enabling, said first conference call such that additional participants are unable to access said first conference call;
   generating, by said computer processor in response to said locking, a virtual holding area for participants associated with a second conference call differing from said first conference call;
   receiving, by said computer processor from a second participant, a conference call request for accessing said second conference call, said second participant differing from said first participant;
   routing, by said computer processor in response to said conference call request; said second participant to said virtual holding area;
   second enabling, by said computer processor in response to a second command from said conference call administrator, said second conference call; and
   routing, by said computer processor in response to said second enabling; said second participant from said virtual holding area to said second conference call.

* * * * *